Dec. 18, 1956  C. M. L. L. BOURCIER DE CARBON  2,774,447
SHOCK ABSORBER
Filed April 17, 1952
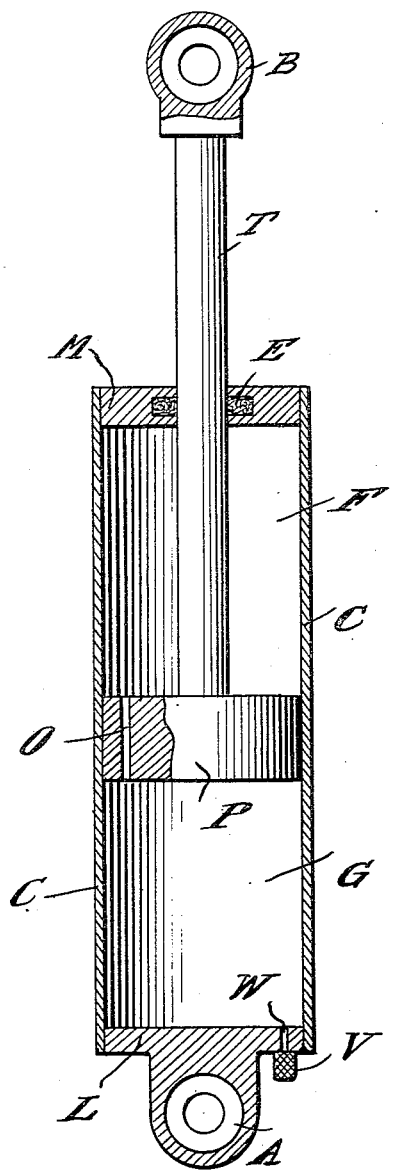
INVENTOR
Christian Marie Lucien Louis
Bourcier de Carbon
BY Watson, Cole, Grindle & Watson
ATTORNEYS United States Patent Office 2,774,447
Patented Dec. 18, 1956

2,774,447

SHOCK ABSORBER

Christian Marie Lucien Louis Bourcier de Carbon, Neuilly-sur-Seine, France

Application April 17, 1952, Serial No. 282,812

Claims priority, application France December 10, 1951

3 Claims. (Cl. 188—88)

This invention relates to shock absorbers and more particularly to shock absorbers of the class employed in providing damped suspensions for land vehicles.

In the suspension of land vehicles, or more precisely, in devices for connecting the wheels to the chassis, it is necessary to distinguish between two essential functions of an absolutely different nature:

(1) The spring action intended to elastically support the weight of the vehicle. This function is essentially a conservation of energy, i. e., it is carried out without conversion of mechanical energy into heat.

(2) The shock absorbing action intended to limit both the amplitudes of oscillation of the chassis and the amplitudes of oscillation of the wheels. This function is essentially an energy dissipator, i. e., it converts the mechanical energy stored in the spring upon its deformation into heat. A shock absorber, as a matter of fact, is essentially an energy-dissipating brake which opposes the relative motion of the axle and the chassis.

The importance of utilizing the shock-absorbing action to provide a comfortable suspension as well as for ability to hold the road, has now been recognized. This is why in present automobiles these two functions, namely the spring and shock-absorbing functions, are separated from each other and taken care of by two different apparatuses; the spring action is, as a matter of fact, generally assured by metal springs (helical springs, torsion bars, leaf springs), and sometimes by rubber springs, while the shock-absorbing action is taken care of in particular either by hydraulic shock absorbers or by solid friction absorbers.

For the purpose of simplification and economy or in order to lighten the weight, it has already been suggested to make use of the elasticity of air or of a gas in order to support the weight of the chassis and to effect the spring and the shock-absorber actions within a single apparatus which then forms a dampened pneumatic spring (pneumatic shock-absorber spring). This is furthermore what is generally done in connection with the suspension member of the landing gears of modern airplanes.

The simultaneous carrying out of the two functions within a single apparatus poses many problems, and such an apparatus, intended to support the entire weight of the chassis (or a substantial part thereof) and which hereinafter will be called a dampened spring or dampened suspension, is, as a matter of fact, essentially different from a shock absorber proper (which is a simple energy-dissipating brake which does not assist in any appreciable manner in elastically supporting the weight of the vehicle). The distinction between these two kinds of apparatus is important and is all the more necessary in view of the fact that the technical terminology is still very imperfect in this connection. In English, in particular, the same words "shock absorber" are often applied indiscriminately to a simple suspension spring, a dampened suspension, or a shock absorber proper.

The present invention concerns more particularly a suspension shock-absorber proper, i. e., an apparatus acting only as brake for the relative oscillations of an axle and of the chassis, without assisting in any substantial manner in the elastic support of the weight of the vehicle.

The hydraulic shock absorbers generally used in automobiles have serious drawbacks due to the non-compressibility of the liquids. This non-compressibility, as a matter of fact, makes it necessary first of all in the case of telescopic type shock absorbers to provide internal mechanism which are more or less complicated in order to compensate for the volume variations which accompany the movement of the piston rod. But, above all, due to this non-compressibility of the liquids, hydraulic shock absorbers transmit to the chassis important forces during small, rapid movements of the wheels, for instance when one is riding over cobblestone, which makes driving much more difficult due to the excessive transmission of high-frequency impulses.

The present applicant has noted that it would be possible to obtain much smoother riding by using in the shock absorber not a liquid, which is a non-compressible fluid, but a gas, which is a compressible fluid. Unfortunately, by simply using a gas without any special precaution, the present applicant has found out that the opposite extreme is encountered, viz. for dimensions of pneumatic shock absorbers which are acceptable in practice, a gas, regardless of the specific gas used, is too compressible to make it possible to act as a shock absorber under suitable conditions of comfort and holding to the road. To be sure, as was expected, there is obtained very smooth driving, but on the one hand there is imparted to the car large oscillations of a long period, i. e., a disagreeable rocking, and on the other hand the wheels bounce too much and the car does not hold the road well. It is undoubtedly the excessive elasticity of the gaseous fluid causing the above-mentioned drawbacks which must be considered the main reason for the failure of the pneumatic shock absorbers tried out up to the present time, despite the considerable advantages afforded by such apparatus such as simplicity of construction and ease of riding.

In order to overcome this drawback, the present applicant has already suggested the use in a shock absorber, of a gas compressed under a strong pressure. Unfortunately, the theoretical calculations, confirmed by experience, show that with this solution it is necessary to use either very strong pressures, which makes the problem of tight joints very difficult, or devices of relatively large size which are therefore costly and take up a large amount of space.

The present invention concerns a novel solution of this problem. It consists in using a fluid having a compressibility intermediate that of a liquid, which is a practically non-compressible fluid, and that of a gas, which is a fluid having a very high degree of compressibility. There are such fluids—these are pneumatic or gaseous emulsions under pressure, i. e., emulsions of a gas under pressure in a liquid such as air in oil, nitrogen in oil and carbon dioxide in oil. The proportions of the gas and liquid may be varied dependent upon a compressibility characteristic desired in a given situation but it is advisable to have a percentage by volume of oil from about 60 to about 95 percent of the total volume. At higher percentages the fluid acts as a liquid which, as has been explained, is undesirable.

Other aims and purposes of the invention will be apparent from the following specification when read in connection with the accompanying drawing in which one embodiment of the invention is illustrated by way of example.

The figure of drawing is a somewhat diagrammatic view in vertical section of a shock absorber exemplifying the principles of the invention.

The illustrated suspension shock absorber comprises essentially, on the one hand, a working cylinder C bearing at one of its ends L an attachment means A by which it is connected with one of the members, the relative movements of which are to be damped. The cylinder C is partially filled with a liquid and partially filled with a gas under a pressure higher than atmospheric pressure so the two fluids will be converted into a pneumatic emulsion under the action of the rapid relative motions of the piston and cylinder during the normal operation of the apparatus. The shock absorber consists, on the other hand, of a piston P sliding within said cylinder and separating it into two working chambers F and G, said piston being connected to an outer attachment means B by means of a rod T which is preferably of small, solid section and passes through a packing E through the upper end M of the cylinder opposite the end L. The piston P is provided with one or more passages O opposing a certain resistance to the motion of the fluid from one of the compartments of the cylinder into the other and preferably has a valve (not shown) which is either entirely open above a certain pressure or preferably opens progressively as a function of the pressure difference on the faces of the piston inasmuch as in the case of compressible fluid shock absorbers, progressive opening valves give better results with respect to the comfort of travel.

A valve V is arranged to control the opening W, preferably formed in the lower end wall L of the cylinder, in such a manner as to conveniently permit the filling of the device with liquid and the placing of the liquid under pneumatic pressure.

Attachment means A and B are connected one to the axle and the other to the chassis of the vehicle, the attachment A which is integral with the cylinder being preferably connected to the axle so as to cause the cylinder to participate in the rapid motion of the wheels, which facilitates the formation of the pneumatic emulsion within the apparatus.

Furthermore, products which modify the surface tension of the oil or other damping medium, such as lecithin, can be added to it so as to facilitate the formation of the pneumatic emulsion and ensure its substantial permanence.

It may seem strange to recommend a pneumatic emulsion as the fluid to be used within a shock absorber, since the emulsifying of air in the oil of a shock absorber is, as a matter of fact, a phenomenon which is considered extremely harmful by all shock absorber manufacturers, who constantly endeavor to avoid it by various methods. An emulsion of air in oil at atmospheric pressure, as a matter of fact, gives rather poor results in a shock absorber. The reason for this is that the compressibility of such an emulsion is much too great for the relatively large forces to be transmitted by the shock absorber between the axle and the chassis, which gives rise to phenomena which are extremely injurious to comfort and to the ability to hold the road.

However, the physical and mechanical properties of a pneumatic emulsion (in particular its compressibility, as well as the phenomena of gaseous solution) are completely modified if, instead of air at atmospheric pressure, a gas, such as air, nitrogen, and carbon dioxide, under a relatively high pressure is used in the emulsification. Such an emulsion, instead of being harmful has, on the contrary, extremely interesting new mechanical properties. It is precisely this observation which forms the basis of the present invention.

What therefore are the pressures which should be used in order to obtain favorable conditions of the pneumatic emulsion?

From theoretical considerations which have been confirmed by practical results, it has been found that in order to have good conditions of comfort and good holding to the road, it is desirable to go up to pressures of 4 to 5 atmospheres. In order to have excellent comfort and an excellent holding to the road, pressures of 8 to 10 atmospheres are necessary.

A shock absorber will, therefore, be considered to be within the scope of the present invention if it uses as its working fluid a pneumatic emulsion under a pressure higher than atmospheric pressure and, a fortiori, of this pressure reaches 4 to 5 atmospheres and, still more so, if this pressure reaches or exceeds 8 to 10 atmospheres.

For several reasons, such shock absorbers constitute a considerable step forward:

(1) First of all, it can be easily realized that the large number of small bubbles of gas under pressure which are uniformly distributed within the liquid is equivalent to the interpositioning of a true pneumatic cushion, the effect of which is to filter out the high frequency impulses to which the wheel is subjected. As a matter of fact, it is found that with such vehicle shock absorbers, the ride is particularly smooth and cushioned.

(2) The pneumatic emulsion shock absorbers therefore present all the advantages of pneumatic shock absorbers without having their various drawbacks; in particular, the operation of the piston remains the same as in the case of hydraulic shock absorbers while, in order to obtain good operating laws, pneumatic shock absorber pistons are much more difficult to produce and require much higher precision.

(3) These novel shock absorbers are characterized by extreme simplicity in manufacture and therefore a low cost price.

(4) In these devices the piston stroke is much greater than with any other hydraulic shock absorber because, in connection with all other hydraulic shock absorbers, a part of the available stroke is necessarily lost by the necessity of providing a chamber outside of the stroke of the piston, generally together with a large number of valves or devices in order to compensate for the variations in volume due to the movement of the rod, the variations in volume due to the thermal expansion of the oil and, finally, the losses due to leaks through the joints. These various compensations are effected here automatically by the spontaneous expansion and contraction of the gas under variations in pressure.

(5) Finally, the oil reserve resulting from the pneumatic expansion is much greater than in any other monotubular shock absorbers, which gives them a much greater life.

It is understood that various changes and modifications may be made in the embodiments illustrated and described herein without departing from the scope of the invention as determined by the subjoined claims.

Having thus described the invention, what is claimed as new and desired to be secured by Letters Patent is:

1. A shock absorber for use in damping the relative movements of two members, which comprises a housing enclosing a working chamber, a body of working fluid in said chamber, an element adapted to reciprocate within said working fluid in said chamber, and means connecting said housing and said reciprocating element respectively with the two members, said fluid consisting of a pneumatic emulsion comprising an intimate mixture of liquid and gas under a pressure greater than atmospheric pressure even when the device is at rest.

2. A shock absorber for use in damping the relative movements of two members, which comprises a housing enclosing a cylindrical working chamber; a working fluid in said chamber; a piston reciprocatable in said working chamber, dividing said chamber into two sections, and adapted during its movement to displace fluid from one side of the piston to the other; passage means in said shock absorber through which a fluid may by-pass said piston; and means connecting said housing and said piston respectively with the two members; said fluid consisting of a gas-liquid emulsion comprising an intimate mixture of liquid and gas under a pressure greater than 4 atmospheres even when the device is at rest.

3. A shock absorber for use in damping the relative movements of the body and the wheel mounting of a vehicle, which comprises a housing enclosing a cylindrical working chamber; a working fluid in said chamber; a piston reciprocatable in said working chamber, dividing said chamber into two sections, and adapted during its movement to displace fluid from one side of the piston to the other; a valved opening through said piston through which said fluid may pass through the piston; and means connecting said housing and said piston respectively with the said body and wheel mounting; said fluid consisting of a substantially permanent gas-liquid emulsion comprising an intimate mixture of liquid and gas under a pressure greater than 4 atmospheres even when the device is at rest.

References Cited in the file of this patent

UNITED STATES PATENTS

| | | |
|---|---|---|
| 1,099,073 | Moir | June 2, 1914 |
| 1,164,371 | Lovejoy | Dec. 14, 1915 |
| 2,018,312 | Moulton | Oct. 22, 1935 |
| 2,214,038 | Beecher | Sept. 10, 1940 |
| 2,635,715 | Riedel et al. | Apr. 21, 1953 |

FOREIGN PATENTS

| | | |
|---|---|---|
| 393,853 | Great Britain | June 15, 1933 |